(No Model.)

J. KNODER.
HORSESHOE.

No. 324,562. Patented Aug. 18, 1885.

Witnesses.

Inventor.
John Knoder,
per Chas. H. Fowler
Attorney

United States Patent Office.

JOHN KNODER, OF AUBURN, INDIANA.

HORSESHOE.

SPECIFICATION forming part of Letters Patent No. 324,562, dated August 18, 1885.

Application filed April 27, 1885. (No model.)

*To all whom it may concern:*

Be it known that I, JOHN KNODER, a citizen of the United States, residing at Auburn, in the county of De Kalb and State of Indiana, have invented certain new and useful Improvements in Horseshoes; and I do hereby declare that the following is a full, clear, and exact description of the same, reference being had to the annexed drawings, making a part of this specification, and to the letters and figures of reference marked thereon.

Figure 1:
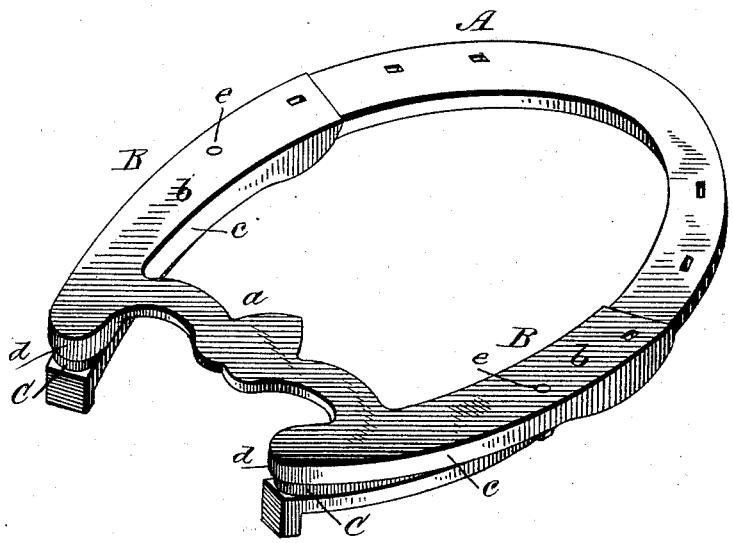
Figure 2:
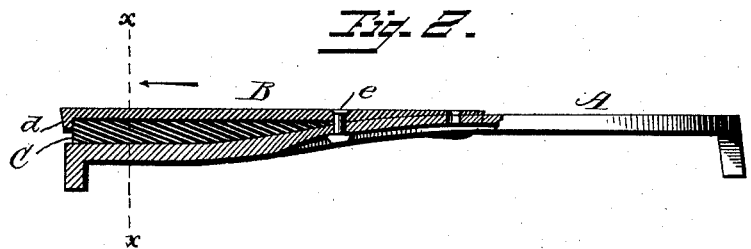

Figure 1 of the drawings is a perspective view of a horseshoe embodying my invention; Fig. 2, a longitudinal section thereof, and Fig. 3 a cross-section taken on line $x\ x$ of Fig. 2.

The present invention has relation to that class of horseshoes provided with elastic cushions upon the upper side thereof, and has for its object to provide a casing of metal or other suitable material in which the rubber or other elastic cushion is inserted and held so as to prevent the material from which the cushion is composed coming in contact with the hoof of the animal, and thus avoid disease and injury to the hoof and foot. These objects I attain by the construction substantially as shown in the drawings, and hereinafter described and claimed.

In the accompanying drawings, A represents the horseshoe, formed of steel, iron, or other suitable metal; and B, the casings, composed of metal or other desirable material—such as wood or leather. The casings B are connected at or near their rear ends with a transverse stay, $a$, said casings consisting of the plates $b$, curved to correspond with the curve in the shoe, and upon each side provided with a downwardly-projecting rim, $c$, said rims passing entirely around the rear ends of the plates, as shown at $d$. The forward ends of the plates $b$ gradually increase in width, as do also the rims $c$, so that the rims will embrace the side edges of the shoe A, and thus hold them more securely in position after the plates have been riveted to the shoe, as shown at $e$.

Figure 3:
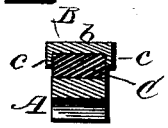

Within the casings B are secured the elastic cushions C, which bear upon the upper face or side of the shoe, as shown more clearly in Figs. 2 and 3.

Having now fully described my invention, what I claim as new, and desire to secure by Letters Patent, is—

The combination, with a horseshoe, of a casing consisting of plates having rims at their sides and rear ends, and at the front ends embracing the side edges of the shoe, and an elastic cushion inserted in the casing, substantially as and for the purpose described.

In testimony that I claim the above I have hereunto subscribed my name in the presence of two witnesses.

JOHN KNODER.

Witnesses:
J. E. SHERLOCK,
R. DEXTER TEFFT.